United States Patent [19]

Iwata

[11] Patent Number: 5,243,321
[45] Date of Patent: Sep. 7, 1993

[54] DISPLAY CONTROL APPARATUS ENABLING CLEAR DISPLAY OF OPERATION PERFORMANCE OF AN ARITHMETIC PROCESSOR

[75] Inventor: Jun Iwata, Tokyo, Japan
[73] Assignee: NEC Corporation, Tokyo, Japan
[21] Appl. No.: 667,310
[22] Filed: Mar. 12, 1991

[30] Foreign Application Priority Data

Mar. 12, 1990 [JP] Japan .................. 2-60174

[51] Int. Cl.⁵ .............. G05B 1/03; G06F 7/02
[52] U.S. Cl. ................. 340/146.2; 307/358; 377/15; 377/39; 395/118; 395/162
[58] Field of Search ......... 307/358; 340/146.2; 395/118, 162; 377/15, 39

[56] References Cited

U.S. PATENT DOCUMENTS

| | | | |
|---|---|---|---|
| 3,538,316 | 11/1970 | Barrett et al. | 340/146.2 |
| 3,600,565 | 8/1971 | Forbes, Sr. | 340/146.2 |
| 4,199,729 | 4/1980 | Durand et al. | 307/351 |
| 4,503,549 | 3/1985 | Slabinski | 377/39 |
| 4,509,044 | 4/1985 | Yachida | 377/39 |
| 4,567,572 | 1/1986 | Morris et al. | 340/146.2 |
| 4,757,464 | 7/1988 | Zimmermann et al. | 377/39 |
| 4,918,636 | 4/1990 | Iwata et al. | 340/146.2 |
| 5,123,086 | 6/1992 | Tanaka et al. | 395/118 |

Primary Examiner—John Zazworsky
Attorney, Agent, or Firm—Foley & Lardner

[57] ABSTRACT

In a display control apparatus for controlling a display unit for displaying operation performance of an arithmetic processor with reference to a performance signal representative of the operation performance, a first producing circuit (28) produces a peak signal in compliance with a count signal produced by a counting circuit (22) which is for counting an operation number of operation of the arithmetic processor. A comparing circuit (31) carries out comparison between the peak and the performance signals to produce a result signal representative of a result of the comparison. A second producing circuit (29) produces the performance signal with reference to the result signal.

5 Claims, 4 Drawing Sheets

DISPLAY CONTROL APPARATUS ENABLING CLEAR DISPLAY OF OPERATION PERFORMANCE OF AN ARITHMETIC PROCESSOR

BACKGROUND OF THE INVENTION

This invention relates to an apparatus for controlling a display unit which is provided for displaying the operation performance of an arithmetic processor, such as a supercomputer.

A recent technical development has brought about an arithmetic processor which is capable of carrying out operations at high speed. The arithmetic processor has an operation performance which is generally evaluated by an operation number (i.e., number of operations) of the arithmetic processor during a predetermined time interval. A display unit is used for displaying the operation number under control by a display control apparatus.

A conventional display control apparatus includes a determining, a counting, a processing, and a sending circuit. The determining circuit is provided for determining a plurality of consecutive time intervals. The counting circuit is provided for counting the number of operations during each of the consecutive time intervals to produce a count signal representative of the operation number. Supplied with the count signal, the processing circuit processes the count signal into a performance signal representative of the operation performance. Supplied with the performance signal, the display unit visibly expresses the operation number in each of the time intervals. In this event, it is important in evaluation of the operation performance to discriminate the operation number which is relatively great and this will be called a peak operation number.

In order to accurately display the peak operation number, it is necessary to make each of the time intervals be short. However, it is difficult to visually observe the peak operation number by a user of the display unit if each of the time intervals is short. This is because the peak operation number disappears from the display unit after temporal appearance.

SUMMARY OF THE INVENTION

It is therefore an object of this invention to provide a display control apparatus which enables a display unit to clearly display the operation performance of an arithmetic processor.

It is another object of this invention to provide a display control apparatus which enables the display unit to display the peak operation number so that it is readily possible to visually observe the peak operation number by a user.

Other object of this invention will become clear as the description proceeds.

In describing the gist of this invention, it is possible to understand that a display control apparatus controls a display unit for displaying the operation performance of an arithmetic processor producing an appropriate signal whenever the arithmetic processor operates. The display control apparatus includes determining means for determining a plurality of consecutive time intervals, counting means responsive to the appropriate signal for counting an operation number (the number of operations) of the arithmetic processor during each of the time intervals to produce a count signal representative of the operation number, processing means for processing the count signal into a performance signal representative of the operation performance, and sending means for sending the performance signal to the display unit.

According to this invention, the processing means of the above-understood display control apparatus comprises: first producing means connected to the counting means for producing a peak signal in compliance with the count signal, second producing means connected to the sending means for producing the performance signal with reference to a local signal; and comparing means connected to the first and the second producing means for carrying out a comparison between the peak signal and the performance signal to produce, as the local signal, a result signal representative of a result of the comparison.

DESCRIPTION OF THE PREFERRED EMBODIMENT

Figure 1:
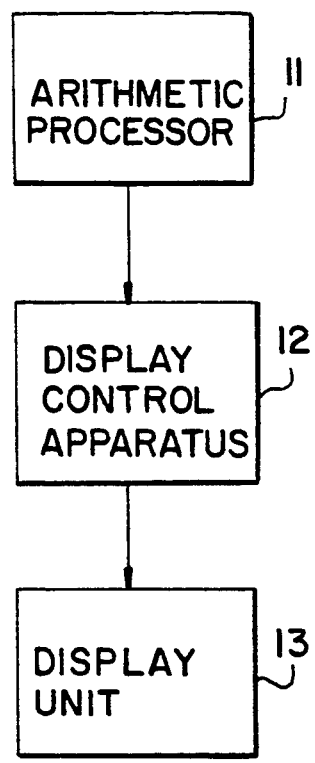
FIG. 1 is a block diagram of a system which shows a display control apparatus according to an embodiment of this invention.

Referring to FIG. 1, description will be made at first as regards a system to which the present invention is applicable. The system comprises an arithmetic processor 11, a display control apparatus 12 according to an embodiment of the present invention, and a display unit 13. The arithmetic processor 11 is, for example, a supercomputer. Whenever operation comes to an end, the arithmetic processor 11 produces an appropriate signal, for example an end signal in the manner known in the art. The end signal is representative of the end of the operation and is supplied to the display control apparatus 12. Supplied with the end signal, the display control apparatus 12 produces a performance signal representative of the operation performance of the arithmetic processor 11. The performance signal is sent to the display unit 13. Responsive to the performance signal, the display unit 13 visually displays a picture or display related to the operation performance.

Figure 2:
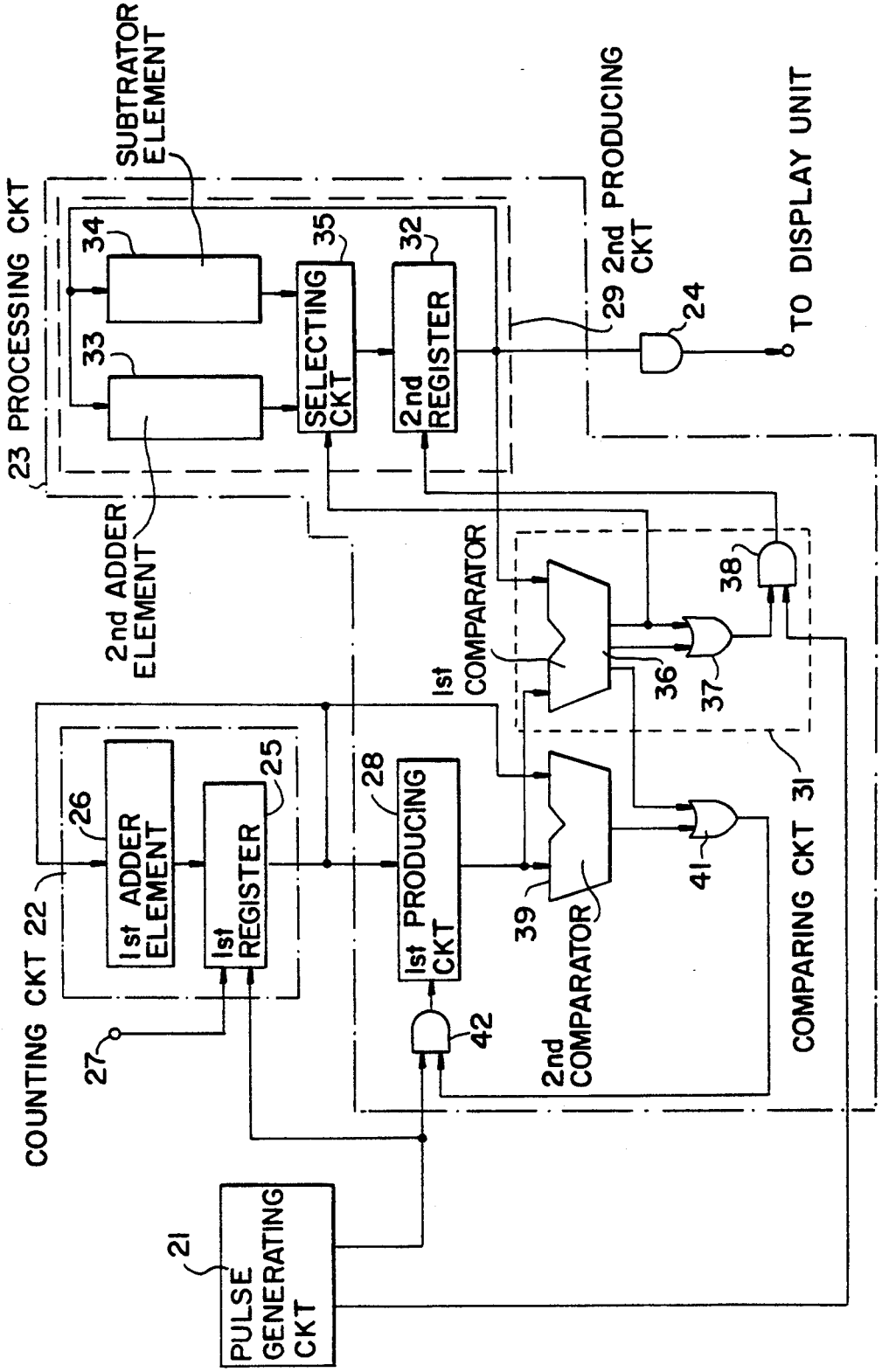
FIG. 2 is a block diagram of the display control apparatus included in the system illustrated in FIG. 1.

Referring to FIG. 2 together with FIG. 1, the description will be directed to the display control apparatus 12. The display control apparatus 12 comprises pulse generating, counting, processing, and sending circuits 21, 22, 23, and 24 which will be described as the description proceeds.

The pulse generating circuit 21 is provided for generating first and second pulse signals. The first pulse signal is intermittently generated at a first predetermined period (T) of, for example, 4 ms and is supplied to the processing circuit 23. The second pulse signal is intermittently generated at a second predetermined period (t) which is shorter than the first predetermined period and which is of, for example, 128 $\mu$s. The second pulse signal is supplied to the counting and the processing circuits 22 and 23. Herein, the pulse generating circuit 21 is referred to as a determining arrangement for determining a plurality of consecutive time intervals. Each time interval may be equal to the second predetermined period.

The counting circuit 22 is provided for counting an operation number of the arithmetic processor 11 during each of the time intervals and comprises a first register 25 and a first adder element 26. The first register 25 is connected to the pulse generating circuit 21 and an apparatus input terminal 27 which is connected to the arithmetic processor 11. The first adder element 26 is connected to the first register 25 and is operable in the manner which will presently be described.

The first register 25 is for memorizing a first number. The first number is cleared in the first register 25 whenever the second pulse signal is supplied to the first register 25. As described below, the first number is equal to the operation number that is counted during each of the time intervals. As a result, the first register 25 produces a count signal representative of the operation number.

In the manner described above, the arithmetic processor 11 produces the end signal whenever its operation comes to an end. Therefore, the operation number of the arithmetic processor 11 is equal to an occurrence number of the end signal. The end signal is supplied to the first register 25 through the apparatus input terminal 27.

Whenever the end signal is supplied, the first register 25 produces a count signal representative of the first number. Responsive to the count signal, the first adder element 26 adds a predetermined decimal number, for example, one, to the first number into a counting circuit sum. As a result, the counting circuit sum becomes equal to the occurrence number of the end signal that is produced during each of the time intervals.

The counting circuit sum is memorized as the first number in the first register 25. Therefore, the first number is equal to the occurrence number, namely, the operation number that is counted during each of the time intervals.

The processing circuit 23 is supplied with the count signal and comprises first producing, second producing, and comparing circuits 28, 29, and 31 which will be described in the following.

The first producing circuit 28 is connected to the first register 25 and is provided for producing a peak signal representative of a peak number of the operation number represented by the count signal. The peak number is renewed in the manner which is described ahead. The peak number is kept in the first producing circuit 28. It is preferable that the first producing circuit 28 is a register known in the art.

The second producing circuit 29 is provided for producing the above-mentioned performance signal and comprises a second register 32, a second adder element 33, a subtractor element 34, and a selecting circuit 35. The second register 32 is connected to the comparing and the selecting circuits 31 and 35. The second adder and the subtractor elements 33 and 34 are supplied from the second register 32 with a second number which is memorized in the second register 32. The selecting circuit 35 is connected to the comparing circuit 31, the second adder element 33, and the subtractor element 34.

The second register 32 is supplied from the comparing circuit 31 with a local signal which will later become clear. The second adder element 33 is for counting up a first count whenever the local signal is supplied to the second register 32. The second adder element 33 produces a count up signal representative of the first count. The subtractor element 34 is for counting down a second count whenever the local signal is supplied to the second register 32. The subtractor 34 produces a count down signal representative of the second count. The selecting circuit 35 is for selecting one of the second adder and the subtractor elements 33 and 34 in compliance with an internal signal produced by the comparing circuit 31 in the manner which will later be described.

The internal signal is represented by one of the logic "0" and "1" levels. When the internal signal has the logic "0" level, the selecting circuit 35 connects the second adder element 33 to the second register 32. When the second adder element 33 is selected, a predetermined decimal number, for example, one, is added to the second number whenever the local signal is supplied to the second register 32.

When the internal signal has the logic "1" level, the selecting circuit 35 connects the subtractor element 34 to the second register 32. When the subtractor element 34 is selected, the predetermined decimal number is subtracted from the second number whenever the local signal is supplied to the second register 32. The second register 32 produces the performance signal that is representative of the second number.

The second register 32 will be referred to as an internal producing arrangement. The second adder element 33 will be called a counting up arrangement. The subtractor element 34 will be named a counting down arrangement.

The performance signal is sent to the display unit 13 through the sending circuit 24. It is preferable that the sending circuit 24 be a buffer gate known in the art.

The comparing circuit 31 is provided for carrying out comparison between the peak signal and the performance signal to produce, as the local signal, a first result signal representative of a result of the comparison. The comparing circuit 31 comprises a first comparator 36, a first OR element 37, and a first AND element 38. The first comparator 36 is connected to the first producing circuit 28 and the second register 32 and has a first, a second, and a third output terminal. The first output terminal is connected to the selecting circuit 35. The first OR element 37 is connected to the first and the second output terminal of the first comparator 36. The third output terminal is used in the manner which will presently be described. The first AND element 38 is connected to the first OR element 37, the pulse generating circuit 21, and the second register 32.

The first comparator 36 is provided for carrying out a comparison between the peak and the performance signals to produce the internal signal. Namely, the first comparator 36 will be referred to as an internal comparing arrangement. When the peak number is less than the second number, the internal signal is sent to the first output terminal with a logic "1" level. Otherwise, the internal signal is given a logic "0" level at the first output terminal. In both events, the internal signal is supplied to the selecting circuit 35 and the first OR element 37 through the first output terminal.

When the peak number is greater than the second number, the internal signal is sent to the second output terminal with the logic "1" level and is supplied to the first OR element 37. Otherwise, the internal signal has the logic "0" at the second output terminal. When the internal signal has the logic "1" level either at one of or at both of the first and the second output terminals, the first OR element 37 produces a first OR signal having a logic "1" level. Otherwise, the first OR signal is given a logic "0" level.

When the first OR signal is given the logic "1" level, the first AND element 38 produces the first result signal of a logic "1" level in response to the first pulse signal. Otherwise, the first result signal is given a logic "0" level even if the first pulse signal is intermittently supplied to the first AND element 38. Responsive to the first result signal, the second register 32 renews the second number to zero. A combination of the first OR and the first AND elements 37 and 38 will be referred to as an internal processing arrangement.

When the peak number is equal to the second number, the internal signal is sent to the third output terminal with the logic "1" level. Otherwise, the internal signal is given the logic "0" level at the third output terminal.

The processing circuit 23 further comprises a second comparator 39, a second OR element 41, and a second AND element 42. The second comparator 39 is connected to the first register 25 and the first producing circuit 28. The second OR element 41 is connected to the second comparator 39 and the third output terminal of the first comparator 36. The second AND element 42 is connected to the second OR element 41, the pulse generating circuit 21, and the first producing circuit 28.

The second comparator 39 is provided for carrying out comparison between the first-mentioned count and the peak signals to produce a second result signal representative of a result of the comparison. The second result signal represents one of logic "0" and "1" levels. When the first number is greater than the peak number, the second result signal is given the logic "1" level. Otherwise, the second result signal has the logic "0" level.

When the logic "1" level is given to at least one of the second result signal and the internal signal that is supplied to the second OR element 41, the second OR element 41 produces a second OR signal having the logic "1" level. Otherwise, the second OR signal has the logic "0" level.

When the second OR signal has the logic "1" level, the second AND element 42 produces a control signal of a logic "1" when supplied with the second pulse signal. Otherwise, the control signal has the logic "0" level even if the second pulse signal is intermittently supplied to the second AND element 42. Responsive to the control signal, the first producing circuit 28 resets the peak number to zero. A combination of the second OR and the second AND elements 41 and 42 will be referred to as a control arrangement.

Figure 3:
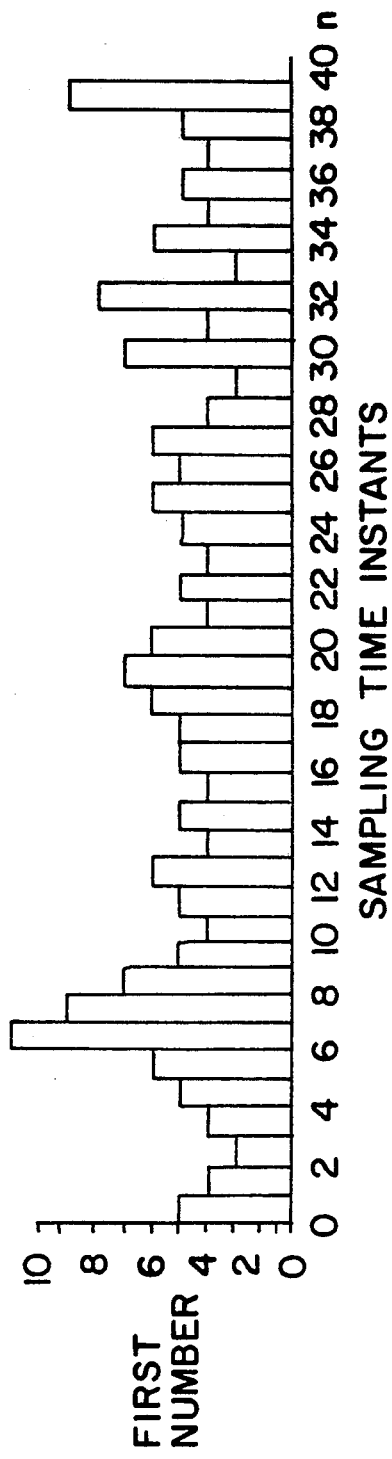
FIG. 3 is a time chart for use in describing the operation of a counting circuit included in the display control apparatus illustrated in FIG. 2.
Figure 4:
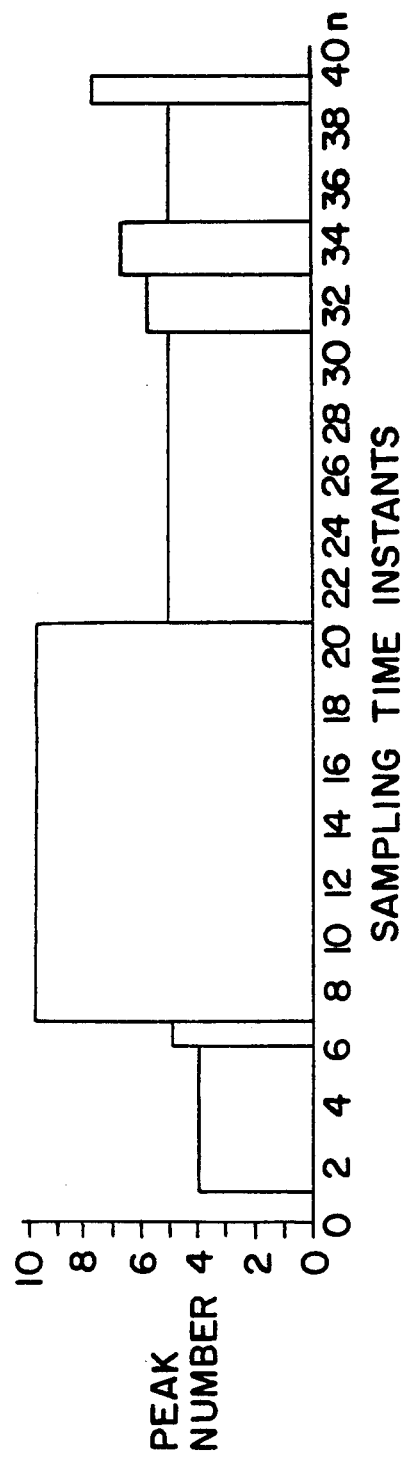
FIG. 4 is a time chart for use in describing the operation of a first producing circuit included in the display control apparatus illustrated in FIG. 2.
Figure 5:
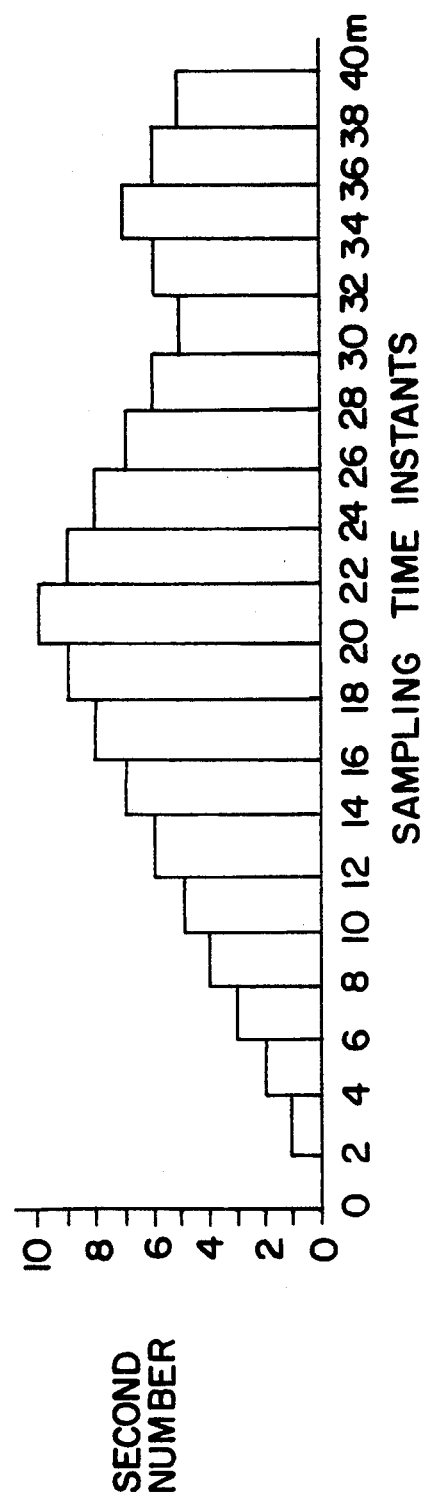
FIG. 5 is a time chart for use in describing the operation of a second producing circuit included in the display control apparatus illustrated in FIG. 2.

Referring to FIGS. 3, 4, and 5 together with FIG. 2, the description will proceed to operation of the counting, the first producing, and the second producing circuits 22, 28, and 29. The consecutive time intervals are defined by a succession of sampling time instants which are depicted in each of FIGS. 3 through 5 and are indicated by consecutive integers. It will be assumed merely for convenience of the description that the first predetermined period is twice the second predetermined period long. It may be mentioned here that the sampling time instants are spaced apart in FIG. 5 by the first predetermined period.

Attention will be directed to a case where the first number changes as exemplified in FIG. 3. The first number is memorized in the first register 25. It is to be noted that the first number has a higher value during a particular time interval defined between adjacent ones (6) and (7) of the sampling time instants. Such a time interval will be referred to in the following as the time instant (6). In the example, the higher value is equal to ten.

In the manner exemplified in FIG. 4, the peak number is memorized in the first producing circuit 28. The peak number is compared with the first number in the second comparator 39. When the peak number is less than the first number, the first number is used as the peak number. Otherwise, the peak number is held constant. For example, the peak number is equal to four at the sampling time instants (1) through (5). This is because the first number is equal to four at the sampling time instant (0) and is less than four at the sampling time instants (1) through (4). Subsequently, the peak number is renewed to five at the sampling time instant (6) because the first number is equal to five at the sampling time instant (5). Next, the peak number becomes equal to ten at the sampling time instant (7) because the first number is ten at the sampling time instant (6). The peak number is held equal to ten at the sampling time instants (7) through (20). This is because the first number is not greater than ten at the sampling time instants (7) through (19). As will shortly be described in detail, the peak number is cleared at the sampling time instant (21).

In the manner depicted in FIG. 5, the second number is memorized in the second register 32. The second number is compared with the peak number in the first comparator 36. When the second number is less than the peak number, the predetermined decimal number is added to the second number. As a result, the second number increases to the peak number. For example, one is added to the second number at each of the even-numbered ones of the sampling time instants (2) through (20). This is because the second number is less than the peak number at the sampling time instants (1) through (19).

Returning to FIG. 4, the peak number is cleared when the second number becomes equal to the peak number. Simultaneously, the first number is used as the peak number. For example, the peak number is cleared at the sampling time instant (21) because the second number is equal to ten at the sampling time instant (20). Simultaneously, the peak number becomes equal to five because the first number is five at the sampling time instant (20). The peak number is held equal to five at the sampling time instants (21) through (30). This is because the first number is not greater than five at the sampling time instants (21) through (29).

Referring to FIG. 5 again, the second number is compared with the peak number in the first comparator 36. When the second number is greater than the peak number, the predetermined decimal number is subtracted from the second number. As a result, the second number decreases towards the peak number. For example, one is subtracted from the second number at each of the even-numbered ones of the sampling time instants (22) through (30). This is because the second number is greater than the peak number at the sampling time instants (22) through (30).

Returning to FIG. 4 again, the peak number is cleared when the second number becomes equal to the peak number. Simultaneously, the first number is used as the peak number. For example, the peak number is cleared at the sampling time instant (31) because the second number becomes equal to the peak number at the sampling time instant (30). Simultaneously, the peak number becomes equal to six because the first number is six at the sampling time instant (30).

While the present invention has thus far been described in connection with only one embodiment thereof, it will readily be possible for those skilled in the art to put this invention into practice in various other manners. For example, it is possible to modify each of the first and the second predetermined periods.

What is claimed is:

1. A display control apparatus for controlling a display unit for displaying operation performance of an arithmetic processor producing an appropriate signal whenever said arithmetic processor operates, said display control apparatus comprising:

determining means for determining a plurality of consecutive time intervals;

counting means responsive to said appropriate signal for counting number of operations of said arithmetic processor during each of said time intervals to produce a count signal representative of an operation number;

processing means for processing said count signal into a performance signal representative of said operation performance; and sending means for sending said performance signal to said display unit, said processing means comprising:

first producing means connected to said counting means for producing a peak signal in compliance with said count signal;

second producing means connected to said sending means for producing said performance signal with reference to a local signal; and comparing means connected to said first and said second producing means for carrying out a comparison between said peak signal and said performance signal to produce, as said local signal, a result signal representative of a result of said comparison.

2. A display control apparatus as claimed in claim 1, wherein said arithmetic processor is provided for producing an end signal representative of an end of said operations, said counting means being connected to said arithmetic processor for counting, as said operation number, a count of said end signal during each of said time intervals to produce said count signal.

3. A display control apparatus as claimed in claim 1, wherein said determining means comprises first generating means for intermittently generating a first pulse signal at a first predetermined period which is equal to a plurality of said consecutive time intervals, said comparing means comprising:

internal comparing means connected to said first and said second producing means for carrying out a comparison between said peak signal and said performance signal to produce an internal signal; and internal processing means connected to said internal comparing means, said first generating means, and said second producing means for processing said internal signal into said result signal in compliance with said first pulse signal.

4. A display control apparatus as claimed in claim 3, wherein said determining means further comprises second generating means for intermittently generating a second pulse signal at a second predetermined period which is shorter than said first predetermined period, said processing means further comprising:

additional comparing means connected to said counting and said first producing means for carrying out an additional comparison between said count signal and said peak signal to produce an additional result signal representative of a result of said additional comparison; and control means connected to said additional comparing means, said second generating means, said internal comparing means, and said first producing means for controlling the operation of said first producing means in compliance with said additional result, said second pulse and said internal signals.

5. A display control apparatus as claimed in claim 3, wherein said second producing means comprises:

counting up means connected to said internal processing means for counting up, each time when said result signal is produced, a first count representative of how many times said result signal is produced, said counting up means producing a count up signal representative of said first count;

counting down means connected to said internal processing means for counting down, each time when said result signal is produced, a second count representative of how many times said result signal is produced, said counting down means producing a count down signal representative of said second count;

selecting means connected to said internal comparing means for selecting one of said counting up and said counting down means in compliance with said internal signal and for producing one of said count up and said count down signals as a selected count signal; and internal producing means connected to said selecting means, said internal processing means, and said sending means for producing said performance signal in compliance with said selected count signal to supply said performance signal to said sending means.

* * * * *